United States Patent

Giers et al.

[11] Patent Number: 5,407,258
[45] Date of Patent: Apr. 18, 1995

[54] CIRCUIT CONFIGURATION FOR A BRAKE SYSTEM WITH ELECTRONIC ANTI-LOCK CONTROL

[75] Inventors: Bernhard Giers, Rossdorf; Mathias Niepelt, Niddatal; Juergen Woywod, Hattersheim; Georg Fachinger, Limburg; Andreas Wieland, Sulzbach, all of Germany

[73] Assignee: ITT Automotive Europe GmbH, Frankfurt am Main, Germany

[21] Appl. No.: 146,151

[22] PCT Filed: Mar. 19, 1992

[86] PCT No.: PCT/EP92/00609
   § 371 Date: Nov. 8, 1993
   § 102(e) Date: Jan. 31, 1994

[87] PCT Pub. No.: WO92/19478
   PCT Pub. Date: Nov. 12, 1992

[30] Foreign Application Priority Data

May 6, 1991 [DE] Germany ............... 41 14 734.0

[51] Int. Cl.$^6$ .................. B60T 8/64; B60T 8/60; B60T 8/72
[52] U.S. Cl. ....................... 303/100; 303/103; 303/106; 303/111; 303/DIG. 4
[58] Field of Search ............... 303/103, 111, 100, 106, 303/105, 107, 108, 109, 110, 96, 97, 104, 91, DIG. 1, DIG. 2, DIG. 3, DIG. 4; 188/181 A, 181 C; 364/426.01, 426.02, 426.03

[56] References Cited

U.S. PATENT DOCUMENTS

| | | | |
|---|---|---|---|
| 4,288,127 | 9/1981 | Leiber et al. | 303/111 |
| 4,320,459 | 3/1982 | Lindemann et al. | 303/111 X |
| 4,374,421 | 2/1983 | Leiber | 303/96 X |
| 4,489,382 | 12/1984 | Jonner et al. | 303/103 X |
| 4,593,955 | 6/1986 | Leiber | 303/111 X |
| 5,066,074 | 11/1991 | Wupper | 303/111 X |
| 5,075,859 | 12/1991 | Frohlich et al. | 364/426.02 |

FOREIGN PATENT DOCUMENTS

| | | |
|---|---|---|
| 0088894 | 9/1983 | European Pat. Off. . |
| 0128582 | 12/1984 | European Pat. Off. . |
| 0381957 | 8/1990 | European Pat. Off. . |
| 2851107 | 6/1980 | Germany . |
| 2855326 | 7/1980 | Germany . |
| 3739558 | 6/1989 | Germany . |
| 3903585 | 8/1990 | Germany . |
| 4021993 | 1/1991 | Germany . |
| 3925828 | 2/1991 | Germany . |
| 2165904 | 4/1986 | United Kingdom . |
| 91/05687 | 5/1991 | WIPO . |

*Primary Examiner*—Douglas C. Butler
*Attorney, Agent, or Firm*—Ratner & Prestia

[57] ABSTRACT

A circuit configuration for a vehicle with electronic anti-lock control having circuits for individual control of the braking pressure variation in the wheel brakes of the wheels of one vehicle axle and for limiting the yawing moment owing to braking pressure differences. Circuits (6) detect the pressure reduction signals (PA1, PA2) individually per wheel and determine the pressure difference (DA12) from these signals. In the case of different friction values ($\mu$-split situation), the mean pressure build-up gradient at the high-value wheel is varied as a function of the pressure difference (DA12) and the vehicle deceleration. At the time of the appearance of the peak yawing moment, namely directly before the low-value wheel will reenter the stable range, the braking pressure at the high-value wheel will be reduced by a value dependent on the vehicle deceleration and on the pressure difference.

24 Claims, 5 Drawing Sheets

CIRCUIT CONFIGURATION FOR A BRAKE SYSTEM WITH ELECTRONIC ANTI-LOCK CONTROL

This application is a national phase filing of International Application No. PCT/EP92/00609.

BACKGROUND OF THE INVENTION

This invention relates to a circuit configuration for an automotive vehicle brake system with electronic anti-lock control. The circuit configuration includes circuits for individually controlling the braking pressure in the wheel brakes of the two wheels of one axle as a function of the rotational behavior of the wheels measured by wheel sensors. The circuit configuration also includes circuits for limiting the yawing moment due to braking pressure differences at the wheels of one axle, by maintaining the braking pressure differences below a permissible pressure difference being variable as a function of the friction value difference at the two wheels.

A similar circuit configuration has been disclosed by DE 39 25 828 A1 (German Patent Application). This patent application discloses an anti-lock control system with individual control of the braking pressure at the two wheels of one axle. In order to limit the yawing moment on road surfaces with very different friction values on the right and left sides, i.e., with μ-split conditions, the pressure difference is limited and, in doing so, the permissible pressure difference is determined as a function of the friction value difference and on the amount of the lower friction value. If this permissible pressure difference is exceeded, pressure will be reduced at the high-value wheel in consideration of the kinetic state of the low-value wheel. In order to determine the permissible pressure difference, in this known anti-lock control system, the pressure metered in by the driver will be measured on the right and left wheels and in either case the nominal pressure will be compared with the actual pressure. The friction value (i.e. friction coefficient) is assessed as a function of the braking pressure. If a predetermined pressure difference is exceeded, braking pressure will be reduced at the high-value wheel, namely at the higher-pressure wheel.

From the aforementioned German Patent Application and from DE 28 51 107 C2 (German Patent Application), it is also already known to perform the pressure reduction for the sake of limiting the yawing moment when, at the end of a control cycle, the low-value wheel again reaches the stable range.

The expenditure for individually measuring braking pressure at each wheel, and evaluating and monitoring the measured results, is significant.

SUMMARY OF THE INVENTION

The present invention pertains to developing a circuit configuration for an anti-lock control system which, on the one hand, ensures the maintenance of the driving stability of the vehicle by limiting the yawing moments—including in critical situations with a high friction value difference on the right and left sides—while simultaneously achieving an effective braking operation with a short stopping distance by utilizing the efficiency of the brakes as well as possible.

The circuit configuration of the present invention includes circuits: (1) which continuously detect a value from pressure reduction signals, this value representing the pressure difference at the two wheels of the one axle; (2) which, in the case of different friction values (i.e. a μ-split situation), vary the mean pressure build-up gradient at the high-value wheel—i.e., at the wheel of less pressure reduction—as a function of the pressure difference or rather on the value representing the pressure difference and on the vehicle deceleration; and (3) which, at the time of the appearance of the so-called peak yawing moment, namely shortly before the wheel running on the lower friction value will reenter the stable range, reduce the braking pressure at the high-value wheel by a value dependent (inter alia) on the vehicle deceleration and on the pressure difference.

According to the present invention, on a road surface with different friction values on the right and left vehicle sides, the braking pressure and the braking pressure difference are controlled, without pressure sensors being used, such that, independently of the onset of anti-lock control and of the control variation, the yawing moment will remain limited to a value uncritical to driving stability. The limitation of the braking pressure or braking pressure increase on the side of the higher friction value is comparatively small, whereby a short stopping distance and, simultaneously, a high driving stability will be ensured. This also applies to vehicles whose construction, meaning the vehicle geometry, or whose load distribution will cause them to tend to instability, caused by yawing moments, critical braking situations such as changing lanes with μ-split conditions, or changes from homogeneous friction values to μ-split values or vice versa.

In order to determine the pressure difference value, an advantageous embodiment of this invention accumulates the pressure reduction times individually per wheel and forms the difference of the amounts available in the two accumulators. In doing so, it is expedient to reduce the contents of the two accumulators by the same maximum amount possible each time either of the two wheels reenters the stable phase, so that the contents of one accumulator is re-zeroed each time and the pressure difference value remains unaltered.

In calculating or ascertaining the pressure difference in the two wheels of one axle, the pressure reduction times are weighted to account for the variation of the brake-system-implied pressure reduction gradient, which is a steep pressure reduction at first, then a flat pressure reduction which asymptotically approaches zero.

According to another embodiment of this invention, the mean pressure build-up gradient of the braking pressure acting on the high-value wheel will be flattened as a function of the vehicle deceleration. The flattening becoming maximal in the vehicle deceleration range which, with a high friction value difference, is critical to stability. Depending on the vehicle type and on the load, the range of critical vehicle deceleration lies between 0.3 g and 0.6 g, in particular between 0.35 g and 0.45 g.

The time of the appearance of the peak yawing moment, occurring directly or shortly before the time when the wheel reenters the stable phase, can be detected by determining the wheel slip and the reacceleration of the wheel. It is namely at this time that the wheel speed approaches the vehicle speed; the wheel slip thus becomes very small and the acceleration of the wheel is positive.

According to an advantageous embodiment of this invention, the braking pressure at the high-value wheel is reduced directly before the appearance of the peak yawing moment for the purpose of yawing moment limitation. This reduction is effected by a pressure reduction pulse measured in accordance with the following relationship $$T_{pulse-hR} = K * T_{red-1R} * f(d\ press.red.) * f[dV/dt(FZ)],$$

wherein K is a constant depending on the pressure reduction gradient of the system, $T_{red-1R}$ represents the pressure reduction time at the low-value wheel in the respective control cycle, f(d press.red.) is a function of the pressure difference determined from the pressure reduction times and f[dV/dt (FZ)] represents a coupling coefficient dependent on the vehicle deceleration.

According to another embodiment of this invention, the response threshold of yawing moment limitation is limited in certain situations or the yawing moment limitation is switched off, for instance, as a reaction to the signal of a corner identification, of a vibration identification, etc.

BRIEF DESCRIPTION OF THE DRAWINGS

Further characteristics, advantages and applications of this invention will become evident from the following description of an embodiment of the present invention, reference being made to the accompanying basic circuit diagram and to the other diagrams.

DETAILED DESCRIPTION OF THE INVENTION

Figure 1:
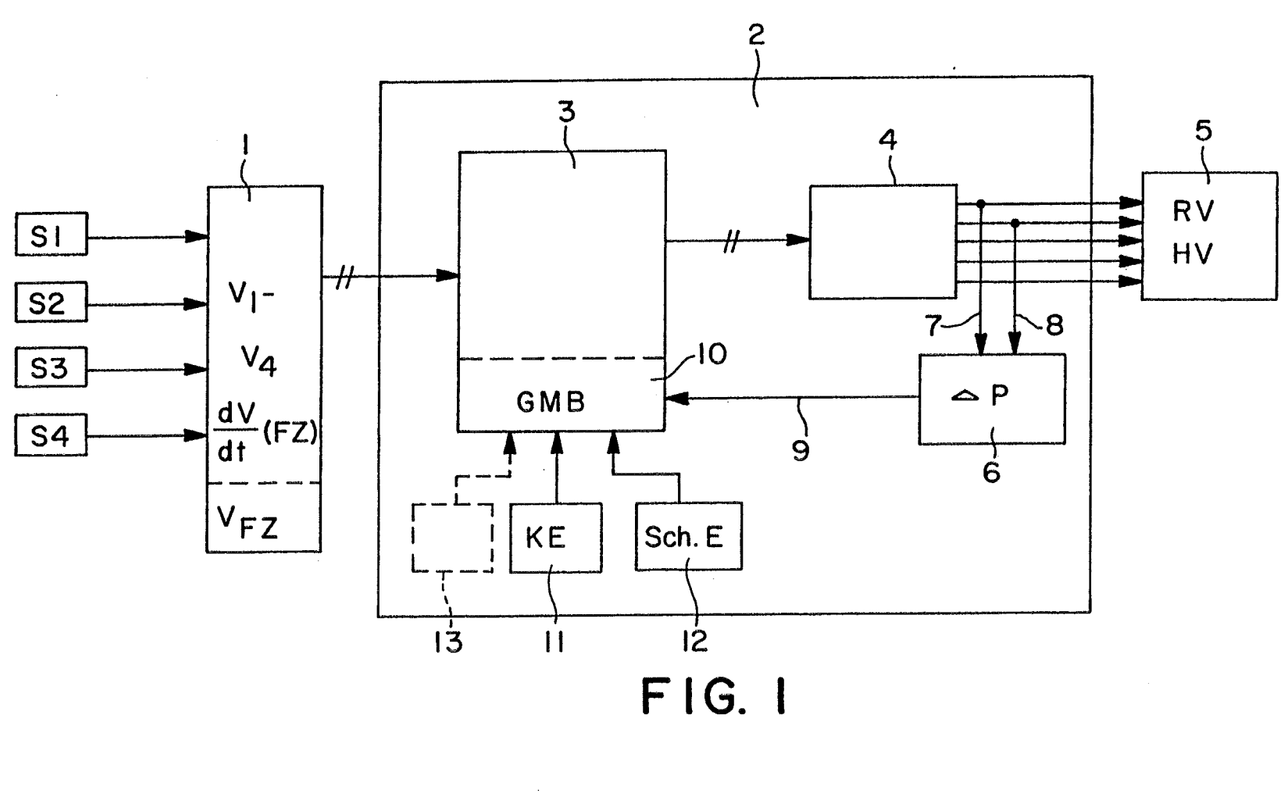
FIG. 1 is the block diagram of the main components of a circuit configuration according to this invention.

FIG. 1, in general, shows the main components of an electronic circuit configuration for a brake system having anti-lock control. The rotational behavior of the individual vehicle wheels is detected by means of wheel sensors S1 through S4. In an evaluation circuit 1, from the sensor signals, the speed variation of the individual wheels $v_1$ through $v_4$ is obtained and a vehicle reference speed $v_{FZ}$ is derived which is needed as a comparative or reference value for assessing and controlling the speed of the individual wheels. Also, evaluation circuit 1 develops vehicle deceleration signals representative of the vehicle deceleration, dV/dt (FZ).

An electronic overall circuitry 2 comprises a logic block 3 wherein the speed signals $v_1$ through $v_4$ and $v_{FZ}$ are logically combined and evaluated. Logic block 3 generates signals for braking pressure modulation. The output signals of the logic block 3 lead to a valve control unit 4 wherein the signals are developed that directly serve to control wheel valves RV, main valves or auxiliary valves HV, all of which are combined in a valve block 5. The wheel valves used usually are electromagnetically operable hydraulic valves designed as inlet or outlet valves. For the sake of simplicity, an operating path, still needed in some embodiments in order to control an auxiliary pressure source, such as a hydraulic pump, is not represented in FIG. 1.

Moreover, the overall circuitry 2 comprises a measuring circuit 6 for measuring the pressure difference at the two individually controlled wheels of one axle. This differential pressure measuring circuit 6 is only fed with the valve control instructions for the two front wheel brakes since in the present example, as will be explained in more detail in the following with reference to the diagrams, a value for the pressure difference at the front wheels will be obtained only from the braking pressure reduction signals. This coupling is symbolized by the two signal lines 7, 8 leading from the outlet of the valve control unit 4 to the measuring circuit 6. As will be explained below with reference to FIGS. 2 and 3, the differential pressure measuring circuit 6 contains accumulators for accumulating the weighted pressure reduction signals. Additional circuits detect the pressure difference. Via a signal line 9, the output signal of the measuring circuit 6 leads to the logic block 3 in order to there actuate a circuit 10, symbolically separated by a broken line, which effects the actual "yawing moment limitation."

Logic block 3 identifies a situation of different friction values during which a high friction value exists at a first wheel of a vehicle axle and a low friction value exists at a second wheel of the vehicle axle. Logic block 3 also detects a peak yawing moment time at which time the yawing moment reaches a maximum value.

Special functions such as corner identification 11 or vibration identification 12 can alter the response thresholds of yawing moment limitation 10 or switch yawing moment limitation temporarily off, such as in case of corner identification. A circuit block 13 outlined by a broken line symbolizes that it is possible to turn on further special functions for influencing yawing moment limitation 10, if required.

On principle, it is possible to realize the functions described and explained with reference to FIG. 1 by means of wired circuits. It is however also possible to realize them by program-controlled circuitries such as microcomputers.

Figure 2:
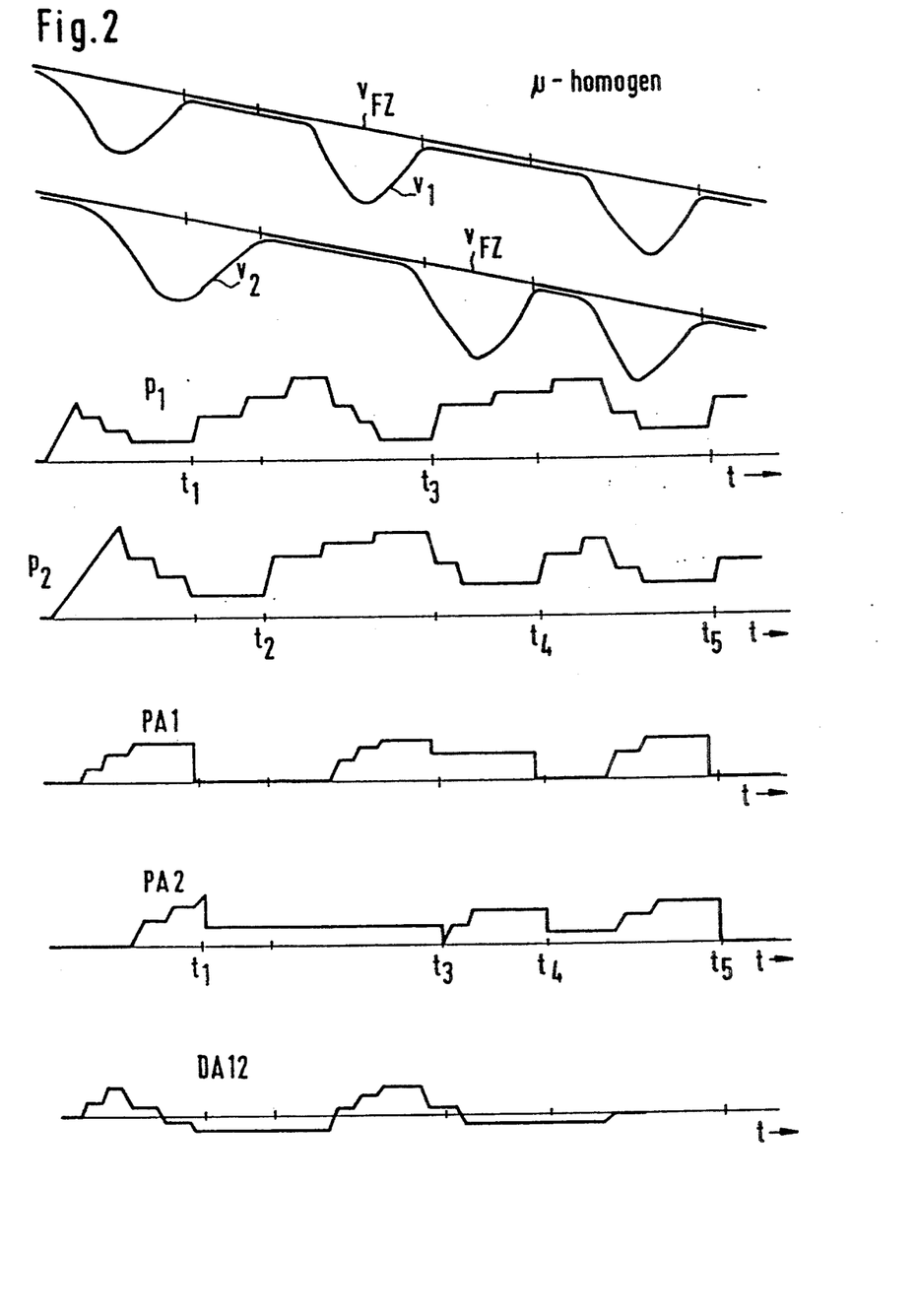
FIG. 2 shows the diagrams of the wheel speeds, the braking pressure variation, the pressure reduction balance and the pressure difference of the two wheels of one axle with homogeneous friction values.

FIG. 2 shows the diagram of a braking pressure control operation or anti-lock control operation with homogeneous friction values. The term "$v_{FZ}$" symbolizes the vehicle speed or the vehicle reference speed, and the terms "$v_1$, $v_2$" symbolize the speeds of the two wheels of one axle. The corresponding pressure variation at wheel 1 moving with speed $v_1$ is referred to by $P_1$, and the pressure variation at the second wheel is referred to by $p_2$. The accumulated pressure reduction times of the first wheel are referred to by PA1, and those of the second wheel by PA2, and the difference of these two values by DA12.

The scaling operations of the accumulated pressure signals PA1 and PA2, where each time the accumulator contents are reduced by the same maximum amount possible, take place at times $t_1$, $t_2$, $t_3$, $t_4$ and $t_5$. At $t_2$, however, the accumulator content PA1 of wheel 1 is already zero so that there will be no change in the accumulator contents PA2, because, as stated above, the accumulator contents are to be reduced by the same maximum amount possible. These times $t_1$ through $t_5$ mark the times when one wheel will reenter the stable range.

In the situation referred to by FIG. 2, i.e., with homogeneous right/left friction values, the pressure difference DA12 is small, as expected, so that there is no need for yawing moment limitation.

Figure 3:
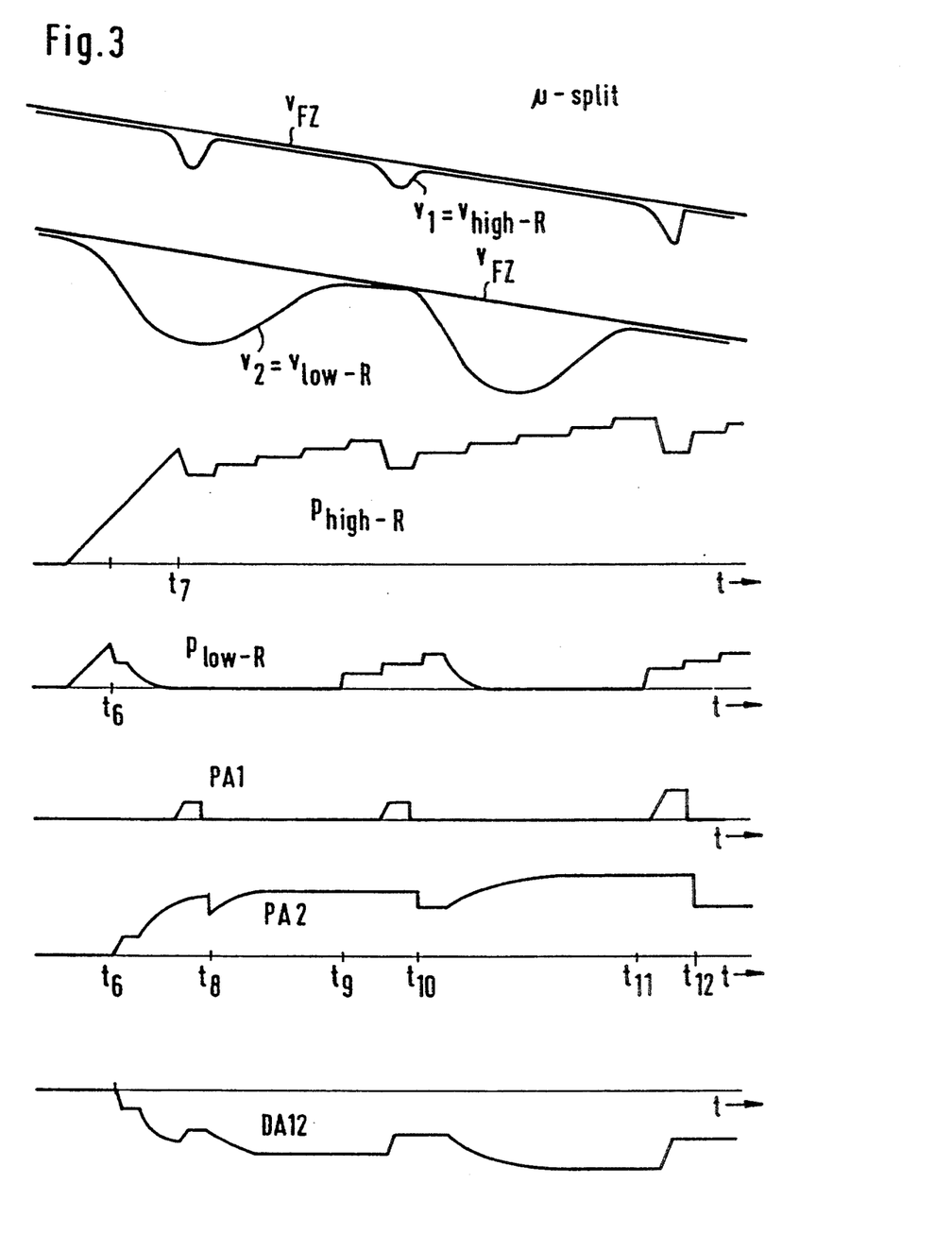
FIG. 3 shows the same diagrams as FIG. 2 except with different friction values on the right and left vehicle sides.

FIG. 3 shows the same curves as FIG. 2 except that a situation with different right/left friction values ($\mu$-split situation) exists. In this case, wheel 1 with rotational behavior $v_1$ is the high-value wheel since it is situated on the high-friction-value vehicle side. Pressure reduction on the low-friction-value vehicle side with corresponding wheel variation $v_2$ will set in at time $t_6$ and will quickly accomplish a complete pressure removal. The high-value wheel will not be affected by control before time $t_7$. From the pressure diagrams, it can be seen that, in such a situation, pressure control at the low-value wheel will take place on a very low level while the level of pressure control will be comparatively high at the high-value wheel. Without yawing moment limitation circuitry, the high pressure difference will lead to high yawing moments and endanger the driving stability.

The accumulation of the pressure reduction operations at the high-value wheel is shown by the variation of curve PA1, and those at the low-value wheel are shown by curve PA2. Scaling operations leading to the reduction of the accumulator contents of the low-value wheel, the wheel having speed $V_2$, take place at times $t_8$, $t_{10}$, $t_{12}$; the stable-phase entry of the low-value wheel at times $t_9$ and $t_{11}$, on the contrary, will have no effect on the accumulator contents as accumulator contents PA1 of the high value wheel will already be zero at these times. Likewise represented in FIG. 3 is the pressure difference DA12 which has a high value throughout the represented braking operation and which can be assumed to lead to a danger to the driving stability of the vehicle ultimately at the time of the appearance of the peak yawing moment.

Figure 4:
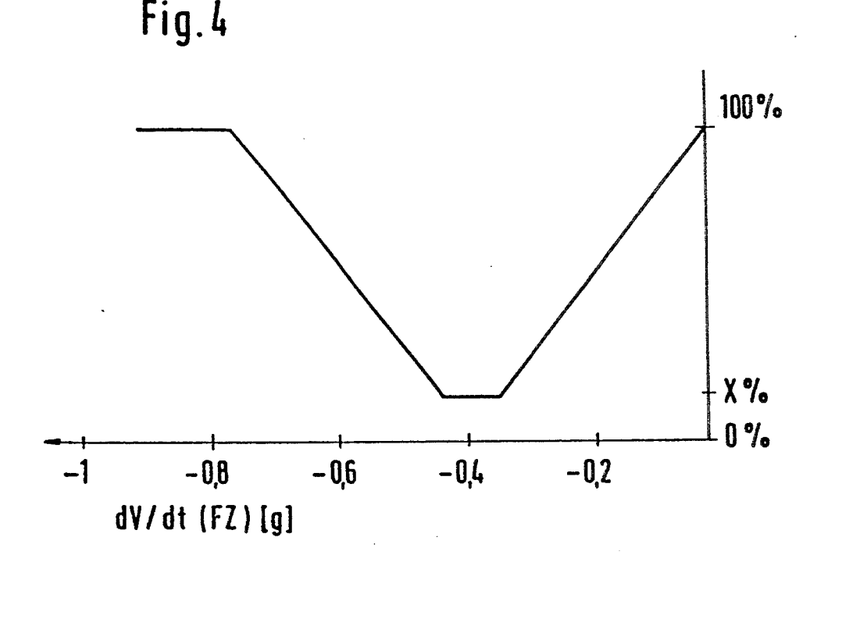
FIG. 4 shows the diagram of the flattening of the pressure build-up gradient as a function of the vehicle deceleration.
Figure 5:
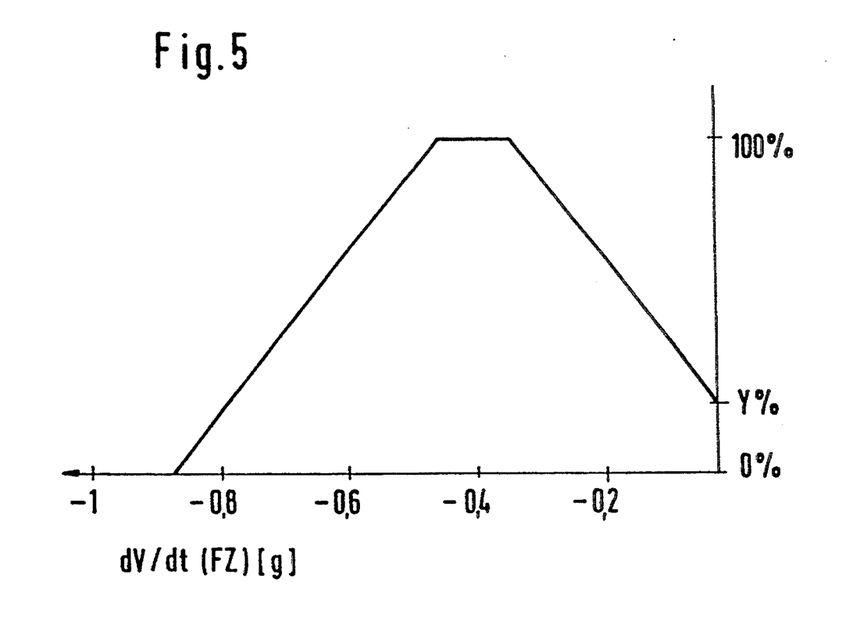
FIG. 5 shows the diagram of the coupling coefficient for rating the pressure reduction pulse for yawing moment limitation as a function of the vehicle deceleration.
Figure 6:
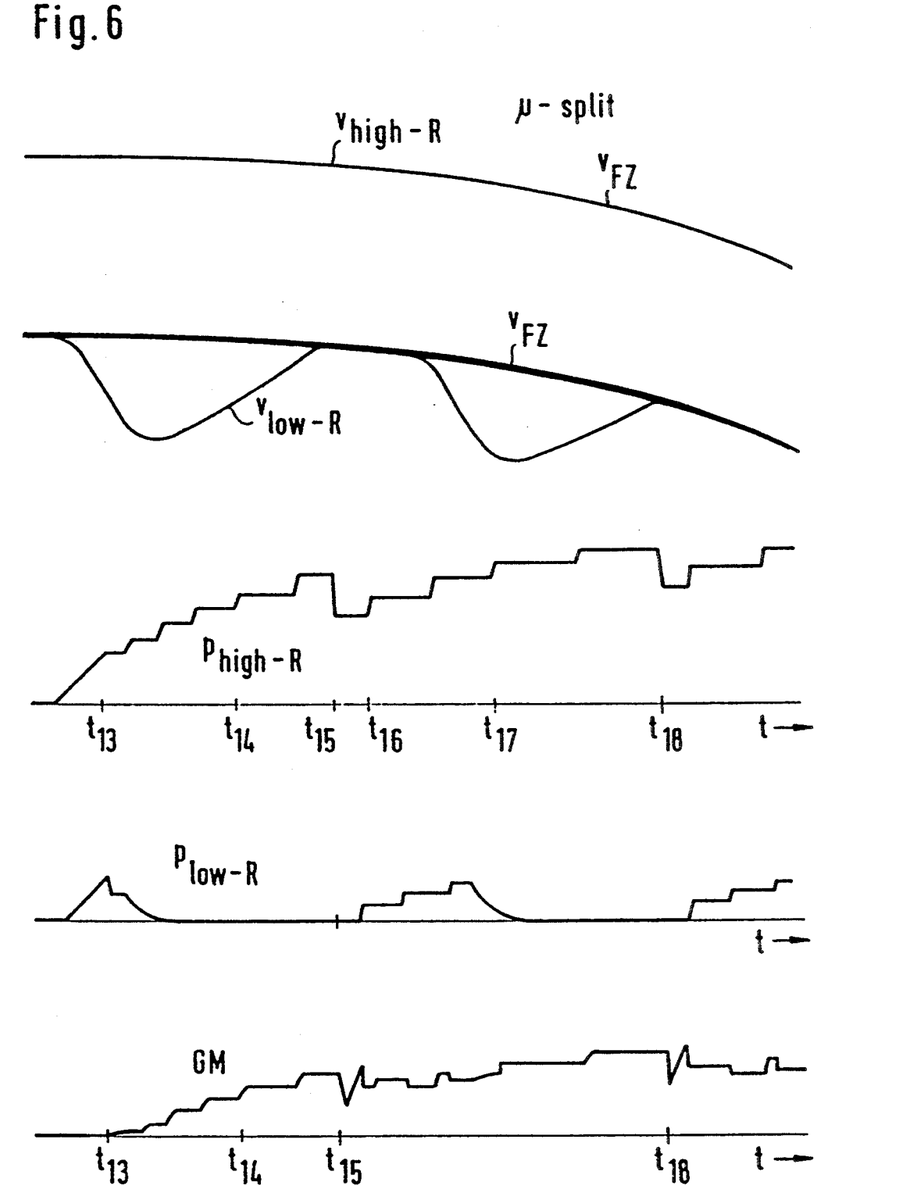
FIG. 6 shows the diagrams of the speed variation of the two front wheels, the braking pressure variation and the yawing moment variation on a road surface with different friction values on the right and left sides ($\mu$-split situation) while using the inventive circuit configuration as shown in FIG. 1.

The diagrams shown in FIGS. 4 through 6 illustrate the further measures in accordance with this invention.

FIG. 6 refers to a situation with very different friction values on the right and left vehicle sides ($\mu$-split situation) and to a control operation by means of a circuit configuration of the present invention. In the situation shown in FIG. 6, the advantages of the inventive yawing moment limitation system will be fully displayed.

With $\mu$-split conditions, namely in situations where yawing moment limitation is called for, continued pressure increase at the high-value wheel will be limited after the commencement of control (at the low-value wheel). This time of the onset of control is referred to by $t_{13}$ for both wheels in accordance with FIG. 6, which represents the wheel speeds of the high-value wheel $v_{high-R}$ as well as of the low-value wheel $v_{low-R}$, the pressure variation $P_{high-R}$ at the high-value wheel and $P_{low-R}$ at the low-value wheel as well as, finally, the yawing moment variation GM.

From FIG. 6 it can be seen that the mean pressure build-up gradient at the high-value wheel in the illustrated situation with high friction value differences on the right and left vehicle sides is flattened by yawing moment limitation. In the present case, this is realized by increasing the time intervals between the individual pressure build-up pulses. This can be seen with special clarity in FIG. 6 in the variation of curve $P_{high-R}$ subsequently to times $t_{14}$, $t_{16}$ and $t_{17}$. Of course, such a decrease or flattening of the pressure build-up gradient could also be accomplished by modifying the pressure control signals in some other way, such as by shortening the pulse duration, while maintaining the pulse interval, or in any similar way.

On principle, the relationship $$\text{mod. press. build-up grad.} = \text{base grad.} * f(d \text{ press. red.}) * f[dV/dt\ (FZ)]$$

applies to the pressure build-up gradient modified by the inventive circuit configuration.

The pressure reduction and the pressure reduction difference will be detected in the manner described with reference to FIG. 3. Because of the dependence on the vehicle deceleration represented by the term or factor of $f(dV/dt)$, it will be achieved that, in the range critical to the vehicle stability, the inventive yawing moment limitation will react in a considerably different way than in the remaining range. Depending on the vehicle construction and load, the range critical to the vehicle stability lies in a range of about 0.35 g to 0.4 g in case of extremely different (e.g. 0.1/0.8) right/left friction values. Therefore, according to this invention, the mean pressure build-up gradient will undergo a considerably stronger flattening in this range as compared with the other ranges. With a very small vehicle deceleration and with values above approximately 0.75 g, which only can be reached by high friction values on both road sides, the modified pressure build-up gradient will practically correspond to the base gradient; no flattening will take place.

FIG. 4 illustrates the variation or rather the flattening of the gradient as a function of the vehicle deceleration. In this example, the critical range is reached with a vehicle deceleration of about 0.35 g to 0.45 g. In this range, the modified gradient will be reduced to a value of 10 to 15% of the base gradient. In the range between 0 to 0.35 g, the modified gradient will continuously diminish. Above 0.45 g the flattening will again be less. At a vehicle deceleration of about 0.75 g and more, the modified gradient will correspond 100% with the base gradient.

From the pressure variation $P_{high-R}$ at the high-value wheel and from the variation of the yawing moment GM in FIG. 6, it can be seen that the inventive circuit configuration brings about a reduction of the pressure at the high-value wheel and, thus, a reduction of the yawing moment directly before the low-value wheel will enter the stable range. Referring to the situation described with reference to the diagrams of FIG. 6, this entry into the stable phase of the low-value wheel takes place at times $t_{15}$ and $t_{18}$.

In an embodiment of a circuit configuration of the present invention, a pressure reduction pulse will trigger the pressure reduction at the high-value wheel in order to reduce the actual yawing moment as it nears its peak. The duration of this pressure reduction pulse is calculated from the relationship $$T_{pulse-hR} = K * T_{red-1R} * f(d\ \text{press.red.}) * f[dV/dt\ (FZ)].$$

The coupling coefficient in the equation for determining the pulse duration $T_{Pulse-hR}$, which is represented by the term of $f[dV/dt\ (FZ)]$ and which depends on the vehicle deceleration, is illustrated in FIG. 5 as a function of the vehicle deceleration. As in FIG. 4, the present example is based on a vehicle whose range critical to stability lies between approximately 0.35 g and 0.45 g. In this range, the coupling coefficient will reach its maximum value. Outside this range, the duration of the pressure reduction pulse $T_{pulse-hR}$ will be reduced by a smaller coupling coefficient.

In this critical range, the pressure reduction pulse at times $t_{15}$ and $t_{18}$, shortly before the entry of the low-value wheel into the stable phased will reduce the mean yawing moment to a value which is not critical to the driving stability of the vehicle. The pressure reduction pulse increases the lateral guiding force of the high-value wheel, reduces the peak yawing moment and ensures that a mean pressure difference between the two wheels of the one axle is not exceeded. As compared with conventional methods, the braking pressure application of the high-value wheel can become higher since the danger to the vehicle stability owing to the peak yawing moment has been eliminated which, in the end, leads to a shortening of the stopping distance.

Because of the described adaptation of yawing moment limitation to the vehicle deceleration which is expressed by the variation of the curves in FIGS. 4 and 5, the effect of yawing moment limitation is reduced outside the vehicle deceleration range critical to stability. Thus, the stopping distance is prevented from becoming unnecessarily lengthened.

We claim:

1. A brake system with anti-lock control for an automotive vehicle having two wheels mounted on a vehicle axle and wheel brakes individually associated with the wheels, said system comprising:

sensor means for sensing rotational behavior of the wheels and generating rotational behavior signals representative of the rotational behavior of the wheels;

first circuit means, responsive to the rotational behavior signals, for generating:
(a) individual wheel speed signals representative of individual wheel speeds,
(b) vehicle reference speed signals representative of a vehicle reference speed, and
(c) vehicle deceleration signals representative of a vehicle deceleration; and second circuit means, responsive to the individual wheel speed signals, and the vehicle reference speed signals, and the vehicle deceleration signals for:
(a) identifying a situation of different friction values during which a high friction value exists at a first of the wheels on the vehicle axle and a low friction value exists at a second of the wheels on the vehicle axle,
(b) generating pressure control signals, which include pressure reduction signals, for controlling brake pressure in the wheel brakes;
(c) generating, in response to the pressure reduction signals, pressure difference signals representative of a brake pressure difference between the first wheel brake and the second wheel brake;
(d) limiting a yawing moment of the vehicle caused by the brake pressure difference by maintaining the brake pressure difference below a permissible level, which varies as a function of the friction value difference between the high friction value at the first wheel and the low friction value at the second wheel;
(e) modifying the pressure control signals to vary a pressure increase gradient of the first wheel as a function of the vehicle deceleration and the brake pressure difference, when a situation of different friction values has been identified;
(f) detecting when the yawing moment of the vehicle reaches a maximum value, and
(g) generating a pressure reduction signal for reducing the braking pressure at the first wheel brake by a value dependent on the vehicle deceleration and on the brake pressure difference, when the yawing moment of the vehicle reaches a maximum value.

2. A system in accordance with claim 1, wherein said second circuit means include:

means for individually accumulating pressure reduction times of the first wheel brake and the second wheel brake and for generating a first accumulated pressure reduction time and a second accumulated pressure reduction time; and means for forming the difference between the first accumulated pressure reduction time and the second accumulated pressure reduction time to develop the brake pressure difference signals.

3. A system as claimed in claim 2, wherein said second circuit means include means for reducing the first accumulated pressure reduction time and the second accumulated pressure reduction time by the same maximum amount possible whenever either of the first or second wheels reenters a stable phase.

4. A system as claimed in claim 3, wherein said second circuit means include means for weighting the first accumulated pressure reduction time and the second accumulated pressure reduction time to approximatively account for a brake-system-implied pressure reduction gradient.

5. A system as claimed in claim 4, wherein said second circuit means include means for reducing the pressure increase gradient of the first wheel as a function of the vehicle deceleration, with a maximum reduction of the pressure increase gradient of the first wheel occurring over a vehicle deceleration range which is critical to driving stability of the vehicle.

6. A system as claimed in claim 5, wherein the maximum reduction occurs over a vehicle deceleration range between 0.3 g and 0.6 g.

7. A system as claimed in claim 6, wherein said second circuit means detect the peak yawing moment time as a function of wheel slip and reacceleration of the wheels.

8. A system as claimed in claim 7, wherein the pressure increase gradient of the first wheel is reduced at the peak yawing moment time by a pressure reduction pulse measured in accordance with the following relationship:

$$T_{pulse-hR} = K * T_{red-lR} * f(d\ press.red.) * f[dV/dt\ (FZ)],$$

wherein K is a constant depending on the pressure reduction gradient of the system, $T_{red-lW}$ represents the pressure reduction time at the second wheel, f(d press. red.) is a function of the brake pressure difference and f[dV/dt (FZ)] represents a coupling coefficient dependent on the vehicle deceleration.

9. A system as claimed in claim 8, wherein the coupling coefficient (f[dV/dt (FZ)]) depends on the vehicle deceleration and has a maximum value in the vehicle deceleration range critical to driving stability.

10. A system as claimed in claim 9, wherein said second circuit means include circuit means for identifying cornering and circuit means for identifying vibration and said second circuit means for limiting the yawing moment are variable in response to said circuit means for identifying cornering and said circuit means for identifying vibration.

11. A system as claimed in claim 5, wherein the maximum reduction occurs over a vehicle deceleration range between 0.35 g and 0.45 g.

12. A system in accordance with claim 1 further comprising a valve block which contains wheel valves associated with the wheel brakes and auxiliary valves, and which responds to the braking pressure control signals.

13. A method for controlling braking pressure in a brake system with anti-lock control for an automotive vehicle having two wheels mounted on a vehicle axle and wheel brakes individually associated with the wheels, said method comprising the steps of:
sensing rotational behavior of the wheels;
determining from the rotational behavior of the wheels:
(a) individual wheel speeds,
(b) a vehicle reference speed, and
(c) a vehicle deceleration;
identifying, from the individual wheel speeds, the vehicle reference speed, and the vehicle deceleration, a situation of different friction values during which a high friction value exists at a first of the wheels on the vehicle axle and a low friction value exists at a second of the wheels on the vehicle axle;
establishing, from the individual wheel speeds, the vehicle reference speed, and the vehicle deceleration, pressure controls, including pressure reductions, for controlling brake pressure in the wheel brakes,
establishing, from the pressure reductions, a pressure difference between the first wheel brake and the second wheel brake;
limiting a yawing moment of the vehicle caused by the brake pressure difference by maintaining the brake pressure difference below a permissible level, which varies as a function of the friction value difference between the high friction value at the first wheel and the low friction value at the second wheel;
modifying the pressure controls to vary a pressure increase gradient of the first wheel as a function of the vehicle deceleration and the brake pressure difference, when a situation of different friction values has been identified;
detecting, from the individual wheel speeds, the vehicle reference speed, and the vehicle deceleration, when the yawing moment of the vehicle reaches a maximum value, and
establishing a pressure reduction for reducing the braking pressure at the first wheel brake by a value dependent on the vehicle deceleration and on the brake pressure difference, when the yawing moment of the vehicle reaches a maximum value.

14. A method in accordance with claim 13, further comprising the steps of:
individually accumulating pressure reduction times of the first wheel brake and the second wheel brake and generating a first accumulated pressure reduction time and a second accumulated pressure reduction time; and
forming the difference between the first accumulated pressure reduction time and the second accumulated pressure reduction time to develop the brake pressure difference.

15. A method as claimed in claim 14, further comprising the step of reducing the first accumulated pressure reduction time and the second accumulated pressure reduction time by the same maximum amount possible whenever either of the first or second wheels reenters a stable phase.

16. A method as claimed in claim 15, further comprising the step of weighting the first accumulated pressure reduction time and the second accumulated pressure reduction time to approximately account for a brake-system-implied pressure reduction gradient.

17. A method as claimed in claim 16, further comprising the step of reducing the pressure increase gradient of the first wheel as a function of the vehicle deceleration, with a maximum reduction of the pressure increase gradient of the first wheel occurring over a vehicle deceleration range which is critical to driving stability of the vehicle.

18. A method as claimed in claim 17, wherein the maximum reduction occurs over a vehicle deceleration range between 0.3 g and 0.6 g.

19. A method as claimed in claim 18, further comprising the step of detecting the peak yawing moment time as a function of wheel slip and reacceleration of the wheels.

20. A method as claimed in claim 19, wherein the pressure increase gradient of the first wheel is reduced at the peak yawing moment time by a pressure reduction pulse measured in accordance with the following relationship:

$$T_{pulse\text{-}hR} = K * T_{red\text{-}lR} * f(d\ press.red.) * f[dV/dt\ (FZ)],$$

wherein K is a constant depending on the pressure reduction gradient of the system, $T_{red\text{-}lW}$ represents the pressure reduction time at the second wheel, f(d press. red.) is a function of the brake pressure difference and f[dV/dt (FZ)] represents a coupling coefficient dependent on the vehicle deceleration.

21. A method as claimed in claim 20, wherein the coupling coefficient depends on the vehicle deceleration and has a maximum value in the vehicle deceleration range critical to driving stability.

22. A method as claimed in claim 21, further comprising the steps of identifying cornering and identifying vibration, and wherein the step of limiting the yawing moment varies in response to the steps of identifying cornering and identifying vibration.

23. A method as claimed in claim 17, wherein the maximum reduction occurs over a vehicle deceleration range between 0.35 g and 0.45 g.

24. A method for controlling braking pressure in a brake system with anti-lock control for an automotive vehicle having two wheels mounted on a vehicle axle and wheel brakes individually associated with the wheels, said method comprising the steps of:
sensing the rotational behavior of the wheels and generating rotational behavior signals representative of the rotational behavior of the wheels;
generating from the rotational behavior signals:

(a) individual wheel speed signals representative of individual wheel speeds,
(b) vehicle reference speed signals representative of a vehicle reference speed, and
(c) vehicle deceleration signals representative of a vehicle deceleration;

identifying, from the individual wheel speed signals, the vehicle reference speed signals, and the vehicle deceleration signals, a situation of different friction values during which a high friction value exists at a first of the wheels on the vehicle axle and a low friction value exists at a second of the wheels on the vehicle axle, generating, from the individual wheel speed signals, the vehicle reference speed signals, and the vehicle deceleration signals, pressure control signals, which include pressure reduction signals, for controlling brake pressure in the wheel brakes, generating, from the pressure reduction signals, pressure difference signals representative of a brake pressure difference between the first wheel brake and the second wheel brake;

limiting a yawing moment of the vehicle caused by the brake pressure difference by maintaining the brake pressure difference below a permissible level, which varies as a function of the friction value difference between the high friction value at the first wheel and the low friction value at the second wheel;

modifying the pressure control signals to vary a pressure increase gradient of the first wheel as a function of the vehicle deceleration and the brake pressure difference, when a situation of different friction values has been identified;

detecting, from the individual wheel speed signals, the vehicle reference speed signals, and the vehicle deceleration signals, when the yawing moment of the vehicle reaches a maximum value, and generating a pressure reduction signal for reducing the braking pressure at the first wheel brake by a value dependent on the vehicle deceleration and on the brake pressure difference, when the yawing moment of the vehicle reaches a maximum value.

* * * * *